July 21, 1931.  H. EMBREE  1,815,145
HOSE CLAMP
Filed Aug. 1, 1930
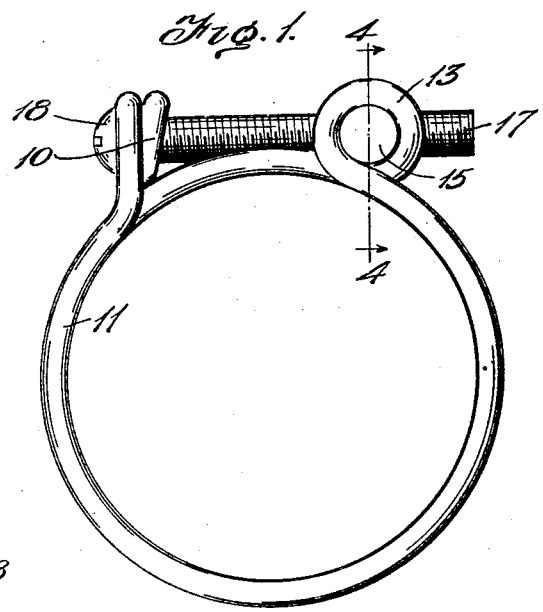
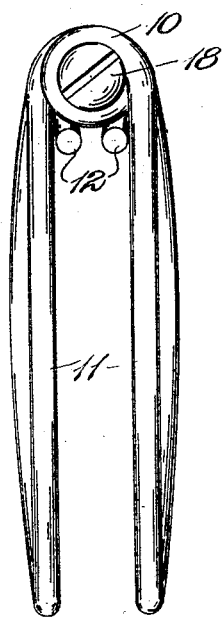
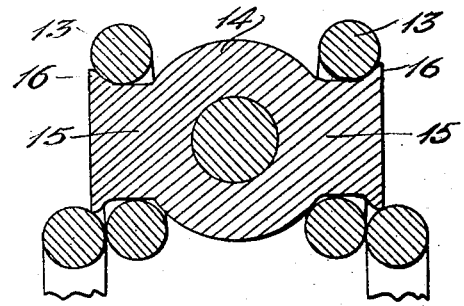
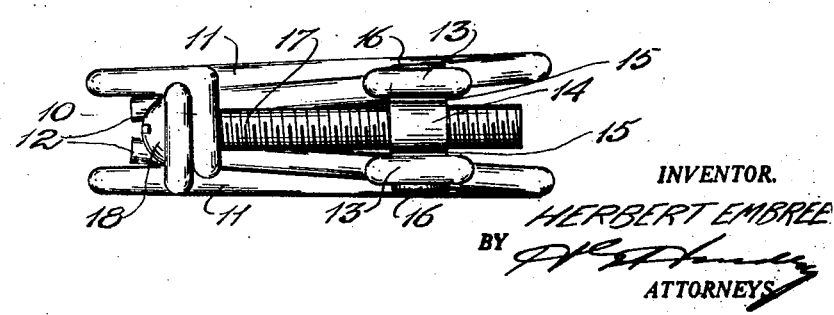
INVENTOR.
HERBERT EMBREE
BY
ATTORNEYS Patented July 21, 1931

1,815,145

UNITED STATES PATENT OFFICE

HERBERT EMBREE, OF HAMILTON, ONTARIO, CANADA

HOSE CLAMP

Application filed August 1, 1930. Serial No. 472,385.

This invention relates to hose clamps such as are employed in securing rubber and fabric hose on the nipples of hose couplings and the like.

One important object of the invention is to provide a novel and improved hose clamp wherein the body is formed from a single length of bent wire.

A second important object of the invention is to provide an improved hose clamp having a bent wire body supporting a nut in such manner that it may rotate on an axis at right angles to the axis of the threaded bore of the nut, the wire being also bent to provide a screw receiving collar.

With the above and other objects in view, as will be presently understood, the invention consists in general of certain novel features of construction and combinations of parts hereinafter fully described, illustrated in the accompanying drawings and specifically claimed.

In the accompanying drawings like characters of reference indicate like parts in the several views, and:

Figure 1 is a side elevation of a hose clamp constructed in accordance with this invention.

Figure 2 is an edge elevation thereof.

Figure 3 is a plan view thereof.

Figure 4 is an enlarged section on the line 4—4 of Figure 1.

In constructing this hose clamp the body is formed from a single length of stout and stiff wire preferably having a considerable degree of resiliency. This wire is doubled and bent to form a short helix 10 preferably having one and one-half convolutions. In any case the wire ends extend from this helix in substantially parallel relation and are arcuately curved in a direction at right angles to the helix to form spaced rings 11 the ends 12 of which lie between the bodies of the rings adjacent the helix 10. Adjacent each end the wire is bent in a single convolution to form a pair of axially alined bearings 13. This constitutes the body.

A nut 14 is provided between the bearings 13 and has journals 15 projecting from opposite sides and carried in said bearings. The ends of these journals are expandingly flanged at 16 to secure them in the bearings and also to prevent the bearings from springing apart. Through the helix 10 extends a screw 17 which is threaded into the nut and has its head 18 bearing against the outer end of the helix.

The clamp is used in the manner common to such articles, being placed on the hose with the screw at least partly unscrewed. After the clamp is adjusted to proper position the screw is screwed up which contracts the annular clamp body and grips the hose firmly onto the coupling, nipple or other fitting to which it is desired to secure the hose.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new is:

1. In a hose clamp, a body formed of a single length of wire having a helix formed at its center and having the wire leading from opposite ends of the helix and forming a pair of spaced concentric and substantially parallel rings, each ring having a convolution formed therein in substantially the plane of the ring, said convolutions being axially alined to form bearings, and means associated with said helix and said convolutions for contracting said rings.

2. In a hose clamp, a body formed of a single length of wire having a helix formed at its center and having the wire leading from opposite ends of the helix and forming a pair of spaced concentric and substantially parallel rings, each ring having a convolution formed therein in substantially the plane of the ring, said convolutions being axially alined to form bearings, a nut having alined journals extending from its sides and seated in said bearings, and a screw extending through said helix and threaded through said nut.

3. In a hose clamp, a body formed of a single length of wire having a helix formed at its center and having the wire leading from opposite ends of the helix and forming a pair of spaced concentric and substantially parallel rings, each ring having a convolution formed therein in substantially the plane of the ring, said convolutions being axially alined to form bearings, a nut having alined journals extending from its sides and seated in said bearings, a screw extending through said helix and threaded through said nut, and expanded ends on said journals holding the bearings from spreading apart.

In testimony whereof I have affixed my signature.

HERBERT EMBREE.